United States Patent
Gao et al.

(10) Patent No.: US 11,839,849 B2
(45) Date of Patent: Dec. 12, 2023

(54) COUPLING SYSTEM OF $CO_2$ CAPTURE IN FLUE GAS AND $CO_2$ MINERALIZATION BASED ON INDUSTRIAL SOLID WASTE

(71) Applicant: Greenore Cleantech (Shanghai) Co., Ltd, Shanghai (CN)

(72) Inventors: Ming Gao, Shanghai (CN); Huangjing Zhao, Shanghai (CN); Xiaozhou Zhou, Shanghai (CN)

(73) Assignee: GREENORE CLEANTECH (SHANGHAI) CO., LTD, Shanghai (CN)

( * ) Notice: Subject to any disclaimer, the term of this patent is extended or adjusted under 35 U.S.C. 154(b) by 0 days.

(21) Appl. No.: 17/828,051

(22) Filed: May 31, 2022

(65) Prior Publication Data

US 2023/0338896 A1 Oct. 26, 2023

(30) Foreign Application Priority Data

Apr. 22, 2022 (CN) .......................... 202210429318.6

(51) Int. Cl.
*B01D 53/62* (2006.01)

(52) U.S. Cl.
CPC ........ *B01D 53/62* (2013.01); *B01D 2251/402* (2013.01); *B01D 2251/404* (2013.01); *B01D 2251/606* (2013.01); *B01D 2257/504* (2013.01); *B01D 2258/0283* (2013.01)

(58) Field of Classification Search
CPC .............. B01D 53/62; B01D 2257/504; B01D 2258/0283; B01D 2251/404; B01D 2251/606; B01D 2251/402; B09B 3/00; B09B 3/10; B09B 3/25; B09B 3/70; B09B 2101/30; Y10S 588/00

See application file for complete search history.

(56) References Cited

FOREIGN PATENT DOCUMENTS

| EP | 2 070 578 A1 * | 6/2009 | ........... B01D 53/261 |
|---|---|---|---|
| EP | 2 532 624 A1 * | 12/2012 | ............ C01B 33/22 |
| KR | 2012 0 043373 A * | 5/2012 | ............ B01D 53/62 |
| WO | WO 2005/046863 A1 * | 5/2005 | ............. B01J 20/04 |

* cited by examiner

*Primary Examiner* — Timothy C Vanoy
(74) *Attorney, Agent, or Firm* — Bayramoglu Law Offices LLC

(57) ABSTRACT

A coupling system of $CO_2$ capture in flue gas and $CO_2$ mineralization based on industrial solid waste includes: 1) an adsorption reaction device configured to treat flue gas with the embedded adsorbents, 2) a thermal decomposition device designed to decompose the first carbonate products to oxides and carbon dioxide, wherein the produced oxides are circulated to the adsorption reaction device, and 3) an industrial solid waste mineralization system configured to treat the deactivated oxides and the as-produced carbon dioxide. The coupling system can not only realize carbon capture and utilization, but also can enable the reuse of waste and the production of high-quality carbonates. Meanwhile, the carbon capture line is also convenient to be organically integrated with the production line of carbon mineralization system based on industrial solid waste, reducing the cost of the whole process.

20 Claims, 3 Drawing Sheets

COUPLING SYSTEM OF $CO_2$ CAPTURE IN FLUE GAS AND $CO_2$ MINERALIZATION BASED ON INDUSTRIAL SOLID WASTE

CROSS REFERENCE TO THE RELATED APPLICATIONS

This application is based upon and claims priority to Chinese Patent Application No. 202210429318.6, filed on Apr. 22, 2022, the entire contents of which are incorporated herein by reference.

TECHNICAL FIELD

This invention belongs to the fields of hydrometallurgy technology, carbon capture, utilization and storage (CCUS), and resource utilization of solid wastes, specifically relating to the coupling system of $CO_2$ capture in flue gas and $CO_2$ mineralization based on industrial solid waste.

BACKGROUND

Calcium looping cycle is one of the common methods of $CO_2$ capture from flue gas. The promising process can not only provide a solution to $CO_2$ capture from flue gas, but also can be integrated with steel plants, power plants, cement plants or lime plants. At the same time, the recovered high-purity $CO_2$ is convenient for collection, storage and transportation. The core principle of $CO_2$ capture via calcium looping cycle method relies on the reversibility of the reaction between CaO and $CO_2$, achieving a continuous cycle of carbonation/calcination.

$$CaO+CO_2 \rightarrow CaCO_3 \ \Delta H=-178 \text{ kJ/mol}$$

$$CaCO_3 \rightarrow CaO+CO_2 \ \Delta H=+178 \text{ kJ/mol}$$

At present, $CO_2$ capture through calcium looping cycle mostly focuses on the flue gas of cement or lime plants. However, it is still a blank field for carbon capture from the flue gas of steel plants. Additionally, the research is still needed for the coupling of carbon capture lines with the relevant steel production lines. Meanwhile, after multiple cycles of reactions, the adsorption capacity of calcium oxide (CaO) in the natural calcium-based adsorbents, such as limestone, will decline sharply, and such deactivated CaO cannot continue to be used as a high-efficiency $CO_2$ adsorbent. In addition, the disposal of the deactivated CaO is also a thorny problem. Though the inactive CaO can be used as the raw material for cement firing in the cement industry, there is still a lack of feasible utilization routes of inactive CaO in other industries. Therefore, a calcium-based adsorbent with a high $CO_2$ capture efficiency and an excellent circulation performance, which at the same time will not cause secondary environmental pollution, is needed for calcium looping cycle method. However, the price of such high-performance calcium-based adsorbent is generally unacceptable to enterprises. Though traditional adsorbents have a lower cost, the usage of traditional absorbents, as discussed above, will lead to a low carbon capture efficiency and a large amount of waste production. Therefore, it has always been a challenge to balance the efficiency and cost of carbon capture in flue gas via calcium looping cycle method.

SUMMARY

In view of the shortcomings and deficiencies as illustrated above, this invention is to provide a coupling system of $CO_2$ capture in flue gas and $CO_2$ mineralization based on industrial solid waste.

In order to solve the above technical problems, the invention is realized through the following technical solutions:

The invention proposes a coupling system of $CO_2$ capture in flue gas and $CO_2$ mineralization based on industrial solid waste, including:

An adsorption reaction device: the flue gas is injected into the adsorption reaction device and reacts with the adsorbents to generate the first carbonate products.

A thermal decomposition device: the first carbonate products are thermally decomposed in the thermal decomposition device to generate oxides and carbon dioxide.

An industrial solid waste mineralization system: the oxides are circulated to the adsorption reaction device. After multiple cycles, the deactivated oxides are transported to the industrial solid waste mineralization system to participate in the carbonation reaction. The as-produced carbon dioxide is transported to the industrial solid waste mineralization system to participate in the carbonation reaction.

Furthermore, in the system described above, the second carbonate products generated from the industrial solid waste mineralization system can be partially recycled to the thermal decomposition device to form a new batch of oxides as a source of supplement to the adsorbents.

Furthermore, the system described above also includes a water-circulation heat transfer device, which is used to collect the heat generated from the adsorption reaction device.

Furthermore, in the system described above, the heated water in the heat transfer device can react with the deactivated oxides to form hydroxides. The hydroxides and carbon dioxide produced from the thermal decomposition device can participate in the mineralization reaction in the industrial solid waste mineralization system.

Furthermore, in the system described above, a heat source of the thermal decomposition device comes from at least one source selected from the group consisting of traditional fossil fuels, sustainable energy such as solar energy and wind energy, nuclear energy, and recovered waste heat from steel slag production.

Furthermore, in the system described above, the carbon dioxide generated by the traditional fossil fuel combustion can be collected and transported into the adsorption reaction device to participate in the adsorption reaction.

Furthermore, in the system described above, the adsorbents include: oxides produced by the thermal decomposition of the first carbonate products, oxides produced by the thermal decomposition of the second carbonate products, natural calcium-based adsorbents, natural magnesium-based adsorbents or alkaline industrial solid wastes.

Furthermore, the system described above also includes a desulfurization device and/or a denitration device. The flue gas is transported to the adsorption reaction device after desulfurization and denitration treatment by the desulfurization device and/or the denitration device.

Furthermore, in the system described above, the industrial solid waste mineralization system includes a mixed reaction device and a solid-liquid separation device. The deactivated oxides and the carbon dioxide produced from the thermal decomposition device are transported to the mixed reaction device to participate in the reaction. The solid-liquid separation device is used to perform a solid-liquid separation of the slurry out of the mixed reaction device, and the unreacted solid particles will be recycled to the next stage of reaction and separation.

Furthermore, in the system described above, the industrial solid waste mineralization system also includes a product preparation device, where the second carbonate products will be produced from the clear liquid phase after solid-liquid separation. The second carbonate products are partially recycled to the thermal decomposition device to produce oxides as a source of supplement to the adsorbents.

Furthermore, in the system described above, the first carbonate products include calcium carbonate, magnesium carbonate or calcium magnesium carbonate. The second carbonate products include calcium carbonate, magnesium carbonate or calcium magnesium carbonate.

Compared with the prior art, this invention has the following technical effects.

This invention can couple the $CO_2$ capture in flue gas with the $CO_2$ mineralization system based on industrial solid waste, in which the concentrated carbon dioxide and the inactive oxides generated during the process of $CO_2$ capture in flue gas can be used as raw materials to produce high-quality carbonates. The coupling of the two processes not only realizes the capture and utilization of carbon dioxide, but also enables the reuse of wastes. Meanwhile, the carbon capture line is also convenient to be organically integrated with the production line of carbon mineralization system based on industrial solid waste. This integration expands the selection scope and acquisition mode of carbon dioxide, reduces the cost of obtaining concentrated carbon dioxide, and optimizes the operation cost of carbon mineralization system based on the industrial solid waste.

The second carbonate products prepared by the industrial solid waste mineralization system in this invention can be partially recycled to the thermal decomposition device to form oxides as a source of supplement to adsorbents. In this way, a dual circulation system is formed. Compared with the prior art, the circulation process can make full use of the calcium and magnesium elements in the industrial solid wastes and realize the reuse of resources. The dual circulation process can ensure the continuity of the reaction process, improve the reaction efficiency, and optimize the comprehensive cost of carbon capture and utilization.

The heated water in the heat transfer device in this invention can absorb the waste heat out of the adsorption reaction device as part of the heat source of the industrial solid waste mineralization system. The thorough utilization of the heated water makes the system energy-saving and economical.

Under the promotion of green economy and resource regeneration, this invention can realize the recycling of solid wastes and carbon dioxide, minimize additional material consumptions and energy consumptions, and result in a negligible secondary environmental pollution. Meanwhile, carbon emission reduction and carbon utilization can also be achieved.

BRIEF DESCRIPTION OF THE DRAWINGS

To explicitly illustrate the characteristics, purposes, and advantages of this invention, a brief description of the drawings is presented.

DETAILED DESCRIPTION OF THE EMBODIMENTS

The technical scheme in the embodiment of the invention will be described clearly and comprehensively in combination with the attached drawings in the embodiment of the invention. Obviously, the described embodiments are only part of all the embodiments of the invention. Based on the embodiments in the invention, all other embodiments obtained by technicians belong to the scope of protection of this application, unless other creative breakthrough can distinguish its work significantly and fundamentally different from this technology.

Figure 1:
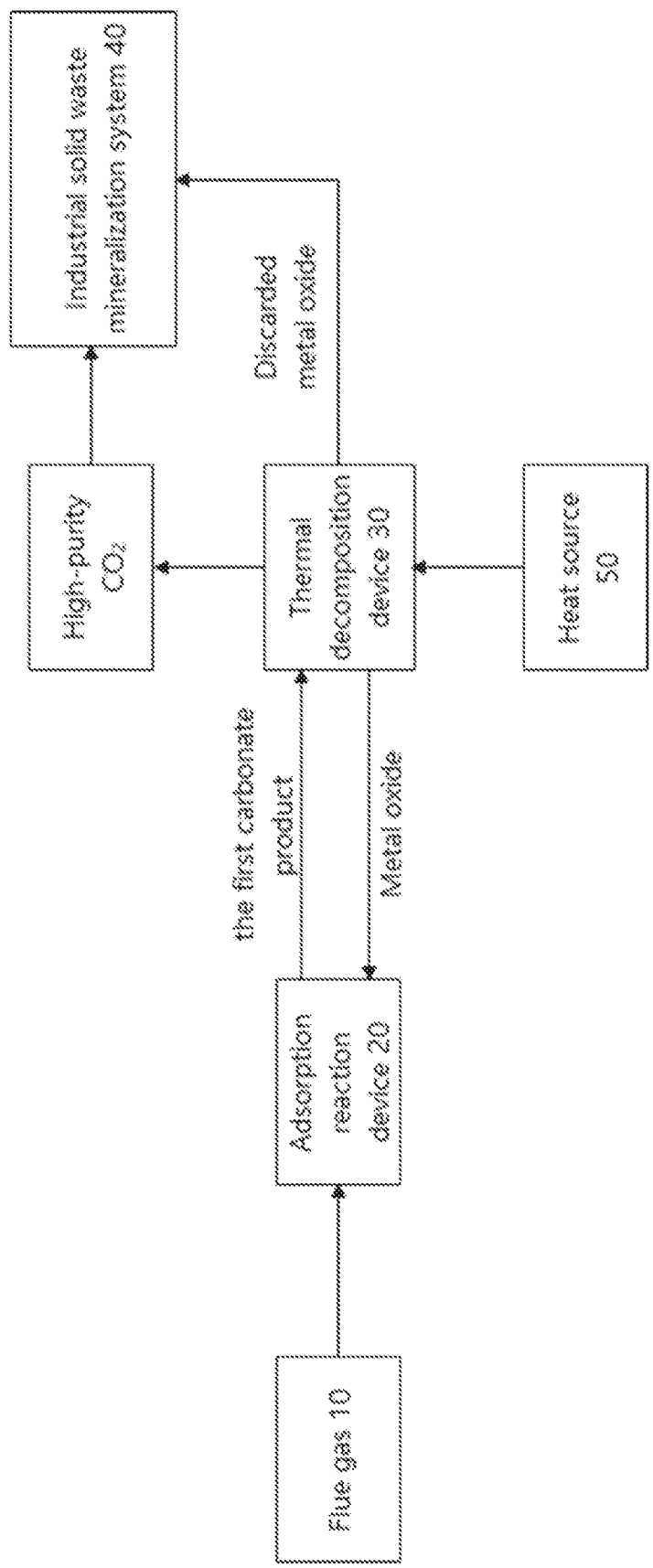
FIG. 1: flow chart of the coupling system of $CO_2$ capture in flue gas and $CO_2$ mineralization based on industrial solid waste in an embodiment of the invention.

As shown in FIG. 1, in one embodiment of the present invention, the coupling system of $CO_2$ capture in flue gas and $CO_2$ mineralization based on industrial solid waste includes:

An adsorption reaction device 20: flue gas 10 is input into the adsorption reaction device 20 and reacts with the adsorbents in the adsorption reaction device 20 to generate the first carbonate products.

A thermal decomposition device 30: the first carbonate products are thermally decomposed in the thermal decomposition device 30 to generate oxides and carbon dioxide.

An industrial solid waste mineralization system 40: the oxides are circulated to the adsorption reaction device 20. After a plurality of reaction cycles, the deactivated oxides are transported to the industrial solid waste mineralization system 40 to participate in the carbonation reaction. The as-produced carbon dioxide is transported to the industrial solid waste mineralization system 40 to participate in the carbonation reaction.

By configuring the adsorption reaction device 20 and the thermal decomposition device 30, this embodiment can couple the carbon dioxide capture method in the flue gas with the industrial solid waste mineralization system 40. Therefore, carbon capture and utilization can be realized, and high-quality chemical products can be produced. At the same time, the carbon capture line is also convenient to be integrated with the production line of the industrial solid waste mineralization system 40, leading to a higher degree of industrialization.

Furthermore, the industrial solid waste involved in this embodiment includes but is not limited to steel slag, raw ore materials or tailings, and other industrial wastes. The raw ore materials include calcium magnesium ores. Other industrial wastes include iron slag, fly ash, bottom ash, red mud, construction waste/waste cement, tailings, etc.

Thereinto, in this embodiment, the adsorbents can adopt the oxides produced by the thermal decomposition of the first carbonate products, the oxides produced by the thermal decomposition of the second carbonate products, natural calcium-based adsorbents, natural magnesium-based adsorbents or alkaline industrial solid wastes. The natural calcium-based adsorbents include but are not limited to limestone, dolomite, etc.

Figure 2:
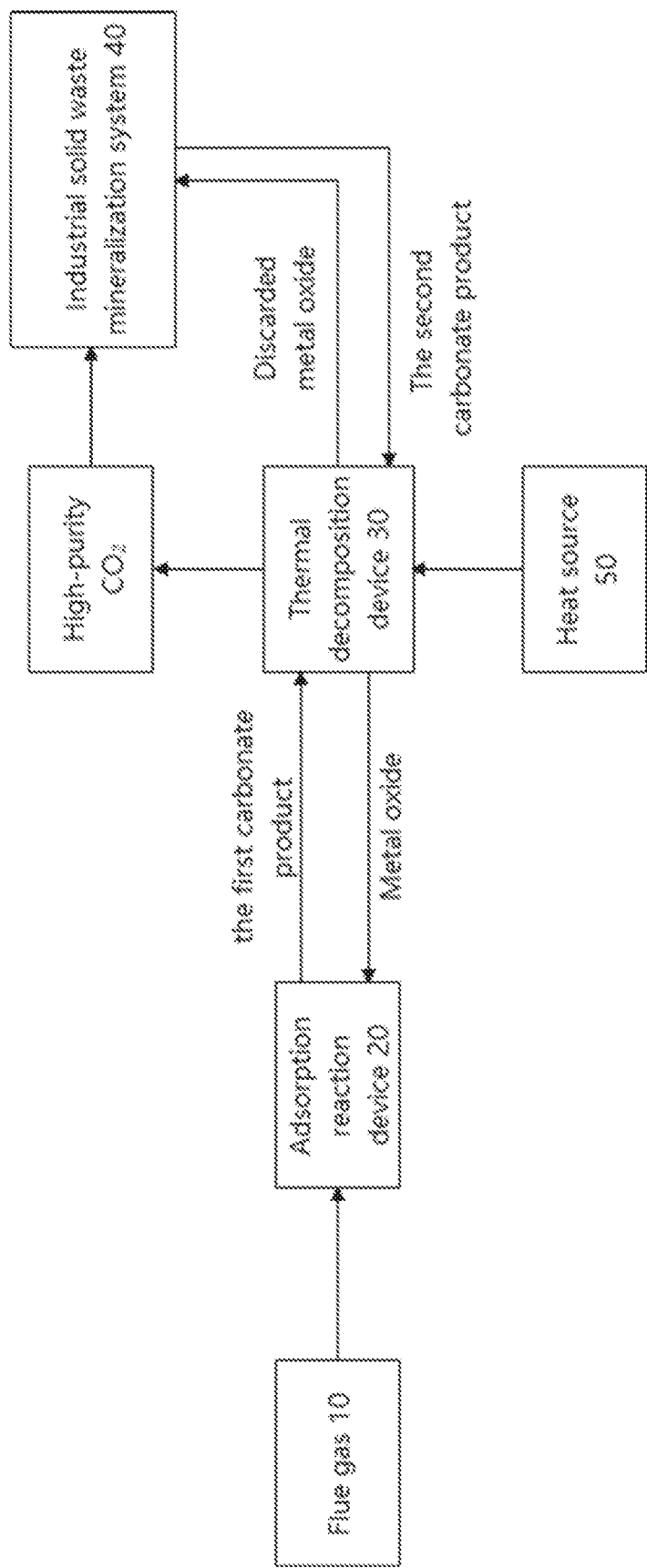
FIG. 2: flow chart of the coupling system of $CO_2$ capture in flue gas and $CO_2$ mineralization based on industrial solid waste in another embodiment of the invention.

Additionally, as shown in FIG. 2, in another embodiment of the invention, the second carbonate products prepared by the industrial solid waste mineralization system 40 can be partially recycled to the thermal decomposition device 30 to form oxides as a source of supplement to the adsorbents. This embodiment adds another internal circulation process based on embodiment 1, which can make full use of the calcium and magnesium elements in the industrial solid wastes and realize the reuse of resources. The dual circulation process can ensure the continuity of the reaction process, improve the reaction efficiency, and optimize the comprehensive cost of carbon capture and utilization.

Thereinto, the first carbonate products include calcium carbonate, magnesium carbonate or calcium magnesium carbonate. The second carbonate products include calcium carbonate, magnesium carbonate or calcium magnesium carbonate.

In the embodiment, the core principle of $CO_2$ capture via calcium looping cycle method, with CaO as the adsorbent, relies on the reversibility of the reaction between CaO and $CO_2$, achieving a continuous cycle of carbonation/calcination.

$$CaO+CO_2 \rightarrow CaCO_3 \ \Delta H=-178 \text{ kJ/mol}$$

$$CaCO_3 \rightarrow CaO+CO_2 \ \Delta H=+178 \text{ kJ/mol}$$

The reaction between CaO and $CO_2$ is exothermic.

When MgO serves as the major adsorbent, the following reactions take place.

$$MgO+CO_2 \rightarrow MgCO_3 \ \Delta H=-1012 \text{ kJ/mol}$$

$$MgCO_3 \rightarrow MgO+CO_2 \ \Delta H=+1012 \text{ kJ/mol}$$

The as-demonstrated two sets of reactions will both occur when adsorbents consist of both CaO and MgO.

Thereinto, the reaction between MgO and $CO_2$ is exothermic.

Furthermore, the system also includes a desulfurization device (not shown in the figure). The flue gas 10 is transported to the adsorption reaction device 20 after desulfurization treatment by the desulfurization device.

Furthermore, the embodiment also includes a denitration device (not shown in the figure). The flue gas 10 is transported to the adsorption reaction device 20 after denitration treatment by the denitration device.

Further preferably, this embodiment can be equipped with a desulfurization device and a denitration device at the same time. The flue gas 10 is treated by the desulfurization device and the denitration device respectively, and then transported to the adsorption reaction device 20. The sequence of the desulfurization device and the denitration device is not limited.

The adsorption reaction device 20 preferably adopts an adsorption tower configuration. Further preferably, the adsorption reaction device 20 adopts a fluidized bed reactor.

Thereinto, after desulfurization and denitration, the flue gas 10 enters the adsorption reaction device 20 for carbonation reaction with CaO to generate $CaCO_3$ products, and the $CaCO_3$ products are transported to the thermal decomposition device 30 for thermal decomposition treatment. Alternatively, after desulfurization and denitration, the flue gas 10 enters the adsorption reaction device 20 for carbonation reaction with MgO to generate $MgCO_3$ products, and the $MgCO_3$ products are transported to the thermal decomposition device 30 for thermal decomposition treatment. Alternatively, after desulfurization and denitration, the flue gas 10 enters the adsorption reaction device 20 for carbonation reaction with calcium magnesium oxides to generate calcium magnesium carbonate products, and the calcium magnesium carbonate products are transported to the thermal decomposition device 30 for thermal decomposition treatment.

In this embodiment, the flue gas 10 comes from power plant flue gas, iron and steel plant blast furnace, converter, refining furnace, lime kiln flue gas, coal chemical tail gas or petrochemical tail gas.

The thermal decomposition device 30 preferably adopts a high-temperature calciner. In this embodiment, the calcination temperature is preferred to be 400-900° C. The first carbonate products are calcined at a high temperature in the high-temperature calciner to generate oxides and $CO_2$. The oxides generated by the reaction can be returned to the adsorption reaction device 20 for cyclic reaction, and can efficiently adsorb $CO_2$ under the actual exhaust gas temperature and pressure of the reaction. When the adsorption capacity of the oxides is reduced to minimum, the deactivated oxides can be transported to the industrial solid waste mineralization system 40 to participate in the mineralization reaction.

Thereinto, the specific reaction processes, as discussed above, are different depending on the first carbonate products. Specifically, when the first carbonate product is $CaCO_3$, the $CaCO_3$ product is calcined at a high temperature in the high-temperature calciner to generate CaO and $CO_2$. The CaO generated by the reaction can be returned to the adsorption reaction device 20 for cyclic reaction, and can efficiently adsorb $CO_2$ under the actual exhaust gas temperature and pressure of the reaction. When the adsorption capacity of CaO drops to minimum, the deactivated CaO can be transported to the industrial solid waste mineralization system 40 to participate in the mineralization reaction of steel slag.

Similarly, when the first carbonate product is $MgCO_3$, the $MgCO_3$ product is calcined at a high temperature in the high-temperature calciner to generate MgO and $CO_2$. The MgO generated by the reaction can return to the adsorption reaction device 20 for cyclic reaction, and can efficiently adsorb $CO_2$ under the actual exhaust gas temperature and pressure of the reaction. When the adsorption capacity of MgO drops to minimum, the deactivated MgO can be transported to the industrial solid waste mineralization system 40 to participate in the mineralization reaction of steel slag.

Similarly, when the first carbonate product is calcium magnesium carbonate, the calcium magnesium carbonate product is calcined at a high temperature in the high-temperature calciner to generate calcium magnesium oxide and $CO_2$. The calcium magnesium oxide generated by the reaction can be returned to the adsorption reaction device 20 for cyclic reaction, and can efficiently adsorb $CO_2$ under the actual exhaust gas temperature and pressure of the reaction. When the adsorption capacity of calcium magnesium oxide drops to minimum, the deactivated calcium magnesium oxide can be transported to the industrial solid waste mineralization system 40 to participate in the mineralization reaction of steel slag.

The adsorption capacity of natural calcium-based adsorbents/magnesium-based adsorbents will decrease sharply after multiple cycles. The fundamental chemistry is explained with natural calcium-based adsorbents, CaO, as an example. During the carbonation process, a fast reaction between CaO and $CO_2$ occurs once $CO_2$ diffuses to the CaO particle surface and penetrates into the larger pores of the CaO particles. The above process is the rapid reaction stage controlled by chemical reaction. Subsequently, the $CaCO_3$ product layer, formed on the particle surface and the pore surface, hinders the reaction between inner CaO and $CO_2$. When the product layer exceeds a critical thickness, the reaction enters the slow reaction stage controlled by the diffusion of $CO_2$ in the product layer. When the adsorbent particles are calcined repeatedly at a high temperature, the grains inside the particles dissolve and grow, leading to a decreasing surface area and a decreasing pore volume of the adsorbent, and thus sintering occurs. With the increase of the number of cycles, the sintering phenomenon intensifies. The number of small holes decreases, and the number of large holes increases. The grains fuse with each other, and the adsorbent particles collapse, resulting in a continuous decline of the adsorption capacity. Therefore, the deactivated CaO after numerous cycles cannot continue to be used as a high-efficiency $CO_2$ adsorbent. Therefore, a low-cost calcium-based adsorbent with a high $CO_2$ capture efficiency and an excellent circulation performance, which at the same time will not cause secondary environmental pollution, is needed for calcium looping cycle method. In response to the above issues, the partially or fully deactivated CaO, in this embodiment, can be transported to the industrial solid waste mineralization system 40 to participate in the mineralization reaction of steel slag. In this manner, the partially or fully deactivated CaO can be perfectly utilized. In addition, this adoption avoids the technical issues in the prior art, such as the need for additional use of high-performance adsorbents such as modified CaO.

In this embodiment, the heat source 50 of the thermal decomposition device 30 comes from at least one source selected from the group consisting of traditional fossil fuels, sustainable energy such as solar energy and wind energy, nuclear energy, and recovered waste heat from steel slag production. If steel slag is used to recover waste heat, the useful resources of the industrial solid waste mineralization system 40 can be fully utilized to realize resource reuse to a greater extent.

Furthermore, in order to further realize resource reuse and effectively fix carbon dioxide, the carbon dioxide generated by the combustion of traditional fossil fuels in this embodiment can be collected and input into the adsorption reaction device 20 to participate in the adsorption reaction, wherein the traditional fuels include but are not limited to natural gas, coal, oil, etc.

The embodiment also includes a water-circulation heat transfer device (not shown in the figure), matched with the adsorption reaction device 20, which is used to collect the heat of the adsorption reaction device 20. Since the reaction of CaO and $CO_2$ and the reaction of MgO and $CO_2$ are strong exothermic reaction processes, the heat released by the reactions can be utilized by the water-circulation heat transfer device as part of the heat source 50 of the subsequent thermal decomposition device 30 to reduce energy consumption.

Furthermore, the heated water in the heat transfer device reacts with the deactivated oxides to form hydroxides. The hydroxides and the carbon dioxide generated from the thermal decomposition device 30 participate in the mineralization reaction in the industrial solid waste mineralization system 40.

Specifically, when the first carbonate product is calcium carbonate, the heated water in the heat transfer device reacts with the deactivated calcium oxide to generate calcium hydroxide. The calcium hydroxide and the carbon dioxide generated from the thermal decomposition device 30 participate in the mineralization reaction in the industrial solid waste mineralization system 40.

Specifically, when the first carbonate product is magnesium carbonate, the heated water in the heat transfer device reacts with the deactivated magnesium oxide to generate magnesium hydroxide. The magnesium hydroxide and the carbon dioxide generated from the thermal decomposition device 30 participate in the mineralization reaction in the industrial solid waste mineralization system 40.

Specifically, when the first carbonate product is calcium magnesium carbonate, the heated water in the heat transfer device reacts with the deactivated calcium magnesium oxide to generate calcium magnesium hydroxide. The calcium magnesium hydroxide and the carbon dioxide generated from the thermal decomposition device 30 participate in the mineralization reaction in the industrial solid waste mineralization system 40.

The specific type of the first carbonates changes with the change of the adsorbents in the adsorption reaction device 20. Similarly, the specific type of the second carbonates varies with the composition of industrial solid waste in the industrial solid waste mineralization system 40.

Figure 3:
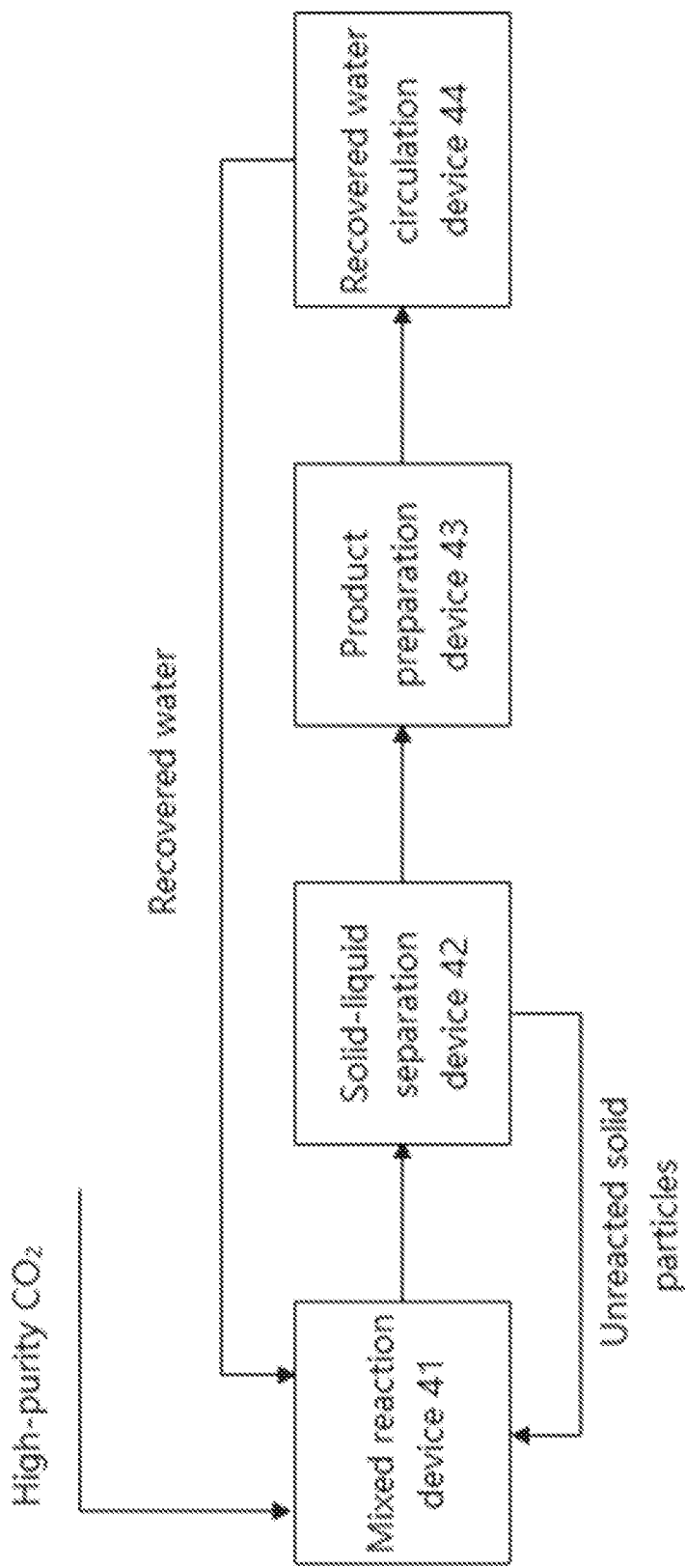
FIG. 3: flow chart of the industrial solid waste mineralization system in an embodiment of the invention.

As shown in FIG. 3, the industrial solid waste mineralization system 40 includes a mixed reaction device 41 and a solid-liquid separation device 42. The deactivated oxides and the carbon dioxide generated from the thermal decomposition device 30 are transported to the mixed reaction device 41 to participate in the reaction. The solid-liquid separation device 42 is used to perform a solid-liquid separation of the slurry out of the mixed reaction device 41, and the unreacted solid particles obtained from the solid-liquid separation will be recycled to the next stage of reaction and separation. The industrial solid waste mineralization system 40 can make full use of the above inactive oxides, carbon dioxide generated from the thermal decomposition device 30, and the industrial solid wastes. Through a series of reaction, separation and other processes, the target products can be obtained, such as calcium carbonate, magnesium carbonate or calcium magnesium carbonate, which will be subjected to a composition change based on the elements contained in the steel slag.

Furthermore, the industrial solid waste mineralization system 40 also includes a product preparation device 43, which prepares the target product based on the clear liquid phase separated by the solid-liquid separation device 42. The clear liquid phase contains the target ions, such as calcium ions, magnesium ions or a mixture of calcium and magnesium ions, and the target products are calcium magnesium carbonate, calcium carbonate, magnesium carbonate, etc.

The embodiment also includes a recovered water circulation device 44. After the clear liquid phase generates the products, the recovered water is circulated to the mixed reaction device 41 through the recovered water circulation device 44, and the recovered water will be circulated at least two times (m≥2).

Furthermore, steel slag, auxiliary reagent and water are continuously added into the mixing reaction device 41 according to a certain proportion, resulting in a slurry after well mixing. Carbon dioxide is continuously injected into the mixed reaction device 41 under a certain pressure and reacts with the slurry. The reacted slurry is continuously discharged from the mixed reaction device 41. The steel slag can also be replaced by other industrial wastes, such as iron slag, fly ash, bottom ash, red mud, construction waste/waste cement, tailings, etc. The steel slag can also be replaced by raw ore materials or tailings, and the raw ore materials include calcium magnesium ores.

The auxiliary reagent comprises at least one organic acid, or one salt based on an organic acid radical or a combination of both. The organic acid includes but is not limited to oxalic acid, citric acid, picolinic acid, gluconic acid, glutamic acid, formic acid, acetic acid, propionic acid, butyric acid, valeric acid, lactic acid, succinic acid, phosphoric acid, pyrophosphoric acid, ascorbic acid or phthalic acid. In this embodiment, by adjusting the pressure of carbon dioxide, the proportion of auxiliary reagents and the reaction temperature, the use of strong acid or highly corrosive acid (nitric acid, hydrochloric acid, sulfuric acid, and hydrofluoric acid) is avoided, and the continuous leaching of the target component is realized.

The slurry discharged out of the mixing reaction device 41 is subjected to at least one stage of solid-liquid separation treatment through the solid-liquid separation device 42. The unreacted solid particles, obtained from the solid-liquid separation, will be recycled as raw materials for the next stage of reaction and separation.

Thereinto, the solid-liquid separation device 42 preferably adopts a two-stage solid-liquid separation. Specifically, the solid-liquid separation device 42 includes a primary coarse separation unit and a secondary fine separation unit. The primary coarse separation unit is used to remove particles larger than 5-10 μm (diameter). The secondary fine separation unit 40 is used to remove solid particles with a particle size ≤1-5 μm (diameter). Through the above multi-stage separation, the optimized separation scheme for particles of different sizes ensures that the separation equipment can stably carry out continuous solid-liquid separation under the optimal load conditions. Such scheme significantly shortens the overall separation time, prolongs the continuous and stable operation of the separation system, and effectively avoids the technical problems caused by a single-stage separation.

Further preferably, the solid-liquid separation device 42 can also be configured as a three-stage solid-liquid separation unit based on the two-stage solid-liquid separation. In this configuration, a clear liquid phase containing target ions can be continuously obtained with the use of a disc centrifuge, a plate and frame filter press or a filter.

Thereinto, when the clear liquid phase contains a high concentration of iron elements after the three-stage solid-liquid separation unit, the iron hydroxide precipitation is collected through enrichment, and the iron elements can be effectively recovered and utilized.

This invention can couple the $CO_2$ capture in flue gas with the $CO_2$ mineralization system based on industrial solid waste, in which the concentrated carbon dioxide and inactive oxides produced in the process of $CO_2$ capture in flue gas can be used as raw materials to produce high-quality carbonates. The coupling of the two processes not only realizes the capture and utilization of carbon dioxide, but also enables the reuse of waste. Meanwhile, the carbon capture line is also convenient to be organically integrated with the production line of carbon mineralization system based on industrial solid waste. This integration expands the selection scope and acquisition mode of carbon dioxide for the carbon mineralization system based on industrial solid waste, reduces the cost of obtaining concentrated carbon dioxide, and optimizes the operation cost of carbon mineralization based on the industrial solid waste. In conclusion, this invention has a promising market prospect.

The above embodiments are only used to illustrate the technical scheme of the invention with reference to the preferred embodiments, but the invention is not limited by these embodiments. It should be understood by technicians in this field that the embodiments of the present invention can be modified or equivalently replaced without departing from the spirit and scope of this invention which shall be all included in the claims of the invention.

What is claimed is:

1. The coupling system of $CO_2$ capture in flue gas and $CO_2$ mineralization based on industrial solid waste, comprising:

an adsorption reaction device, wherein the flue gas is injected into the adsorption reaction device and reacts with adsorbents in the adsorption reaction device to generate first carbonate products;
    a thermal decomposition device, wherein the first carbonate products are thermally decomposed in the thermal decomposition device to generate oxides and carbon dioxide;
    an industrial solid waste mineralization system, wherein after the oxides are circulated to the adsorption reaction device for multiple cyclic reactions, the oxides become deactivated oxides, and the deactivated oxides are transported to the industrial solid waste mineralization system to participate in a carbonation reaction; the carbon dioxide produced from the thermal decomposition device is transported to the industrial solid waste mineralization system to participate in the carbonation reaction; and the carbonation reaction in the industrial solid waste mineralization system generates second carbonate products.

2. The coupling system according to claim 1, wherein the second carbonate products are partially recycled to the thermal decomposition device to form a new batch of the oxides as a source of supplement to the adsorbents.

3. The coupling system according to claim 2, wherein
    the first carbonate products comprise at least one carbonate selected from the group consisting of calcium carbonate, magnesium carbonate, and calcium magnesium carbonate;
    the second carbonate products comprise at least one carbonate selected from the group consisting of calcium carbonate, magnesium carbonate, and calcium magnesium carbonate.

4. The coupling system according to claim 1, further comprising:
    a water-circulation heat transfer device, wherein the water-circulation heat transfer device is used to collect heat generated from the adsorption reaction device.

5. The coupling system according to claim 4, wherein
    the heat transfer device comprises heated water;
    the heated water in the heat transfer device is configured to react with the deactivated oxides to form hydroxides; and
    the hydroxides and the carbon dioxide produced from the thermal decomposition device participate in a mineralization reaction in the industrial solid waste mineralization system.

6. The coupling system according to claim 5, wherein
    the first carbonate products comprise at least one carbonate selected from the group consisting of calcium carbonate, magnesium carbonate, and calcium magnesium carbonate;
    the second carbonate products comprise at least one carbonate selected from the group consisting of calcium carbonate, magnesium carbonate, and calcium magnesium carbonate.

7. The coupling system according to claim 4, wherein
    the first carbonate products comprise at least one carbonate selected from the group consisting of calcium carbonate, magnesium carbonate, and calcium magnesium carbonate;
    the second carbonate products comprise at least one carbonate selected from the group consisting of calcium carbonate, magnesium carbonate, and calcium magnesium carbonate.

8. The coupling system according to claim 1, wherein a heat source of the thermal decomposition device comes from at least one source selected from the group consisting of: traditional fossil fuels, sustainable energy, nuclear energy, and recovered waste heat from steel slag production, the sustainable energy is at least one selected from the group consisting solar energy and wind energy.

9. The coupling system according to claim 8, wherein
the first carbonate products comprise at least one carbonate selected from the group consisting of calcium carbonate, magnesium carbonate, and calcium magnesium carbonate;
the second carbonate products comprise at least one carbonate selected from the group consisting of calcium carbonate, magnesium carbonate, and calcium magnesium carbonate.

10. The coupling system according to claim 1, wherein carbon dioxide generated by traditional fossil fuel combustion is collected and transported into the adsorption reaction device to participate in an adsorption reaction.

11. The coupling system according to claim 10, wherein
the first carbonate products comprise at least one carbonate selected from the group consisting of calcium carbonate, magnesium carbonate, and calcium magnesium carbonate;
the second carbonate products comprise at least one carbonate selected from the group consisting of calcium carbonate, magnesium carbonate, and calcium magnesium carbonate.

12. The coupling system according to claim 1, wherein the adsorbents are selected from the group consisting of oxides produced by the thermal decomposition of the first carbonate products, oxides produced by the thermal decomposition of the second carbonate products, natural calcium-based adsorbents, natural-magnesium based adsorbents, and alkaline industrial solid wastes.

13. The coupling system according to claim 12, wherein
the first carbonate products comprise at least one carbonate selected from the group consisting of calcium carbonate, magnesium carbonate, and calcium magnesium carbonate;
the second carbonate products comprise at least one carbonate selected from the group consisting of calcium carbonate, magnesium carbonate, and calcium magnesium carbonate.

14. The coupling system according to claim 1, further comprising
a desulfurization device and/or a denitration device,
wherein the flue gas is transported to the adsorption reaction device after desulfurization by the desulfurization device and/or denitration treatment by the denitration device.

15. The coupling system according to claim 14, wherein
the first carbonate products comprise at least one carbonate selected from the group consisting of calcium carbonate, magnesium carbonate, and calcium magnesium carbonate;
the second carbonate products comprise at least one carbonate selected from the group consisting of calcium carbonate, magnesium carbonate, and calcium magnesium carbonate.

16. The coupling system according to claim 1, wherein the industrial solid waste mineralization system comprises a mixed reaction device and a solid-liquid separation device,
wherein the deactivated oxides and the carbon dioxide produced from the thermal decomposition device are transported to the mixed reaction device to participate in the carbonation reaction;
wherein the solid-liquid separation device is used to perform a solid-liquid separation of a slurry coming out of the mixed reaction device, and unreacted solid particles are recycled to a next stage of reaction and separation.

17. The coupling system according to claim 16, wherein the industrial solid waste mineralization system further comprises a product preparation device,
wherein the second carbonate products are produced from a clear liquid phase Obtained after the solid-liquid separation; and the second carbonate products are partially recycled to the thermal decomposition device to produce the oxides as a source of supplement to the adsorbents.

18. The coupling system according to claim 15, wherein
the first carbonate products comprise at least one carbonate selected from the group consisting of calcium carbonate, magnesium carbonate, and calcium magnesium carbonate;
the second carbonate products comprise at least one carbonate selected from the group consisting of calcium carbonate, magnesium carbonate, and calcium magnesium carbonate.

19. The coupling system according to claim 14, wherein
the first carbonate products comprise at least one carbonate selected from the group consisting of calcium carbonate, magnesium carbonate, and calcium magnesium carbonate;
the second carbonate products comprise at least one carbonate selected from the group consisting of calcium carbonate, magnesium carbonate, and calcium magnesium carbonate.

20. The coupling system according to claim 1, wherein
the first carbonate products comprise at least one carbonate selected from the group consisting of calcium carbonate, magnesium carbonate, and calcium magnesium carbonate;
the second carbonate products comprise at least one carbonate selected from the group consisting of calcium carbonate, magnesium carbonate, and calcium magnesium carbonate.

* * * * *